Jan. 13, 1953

D. B. ADAMS 2,625,355

PALLET

Filed Feb. 26, 1949

Inventor
DAN B. ADAMS

By Rule and Hoge.
Attorneys

Patented Jan. 13, 1953

2,625,355

UNITED STATES PATENT OFFICE 2,625,355

PALLET

Dan Boyd Adams, Toledo, Ohio, assignor to Owens-Illinois Glass Company, a corporation of Ohio Application February 26, 1949, Serial No. 78,559

7 Claims. (Cl. 248—120)

My invention relates to pallets which are used in industrial operations in connection with fork lift trucks for lifting, transporting, stacking, loading and unloading various articles, such as cartons, packaged goods and the like. The invention provides a pallet of a type designed to permit the load lifting and transporting device, such as a fork lift, either to lift the load from the pallet or to lift the pallet with the goods stacked thereon.

The invention in the form herein illustrated is particularly designed for use in connection with the storing and shipping of cartons or other packages. It is customary to transport such cartons on pallets to a warehouse after the cartons have been loaded, for example, in a factory and later transfer them on the pallets to cars or trucks for shipping. The size of the pallet and the load thereon which can be used for loading or unloading a freight car or a truck, is limited, necessitating the use of comparatively small pallets and handling of the cartons in small loads.

An object of the present invention is to provide a pallet of a novel construction designed and adapted for holding a double stack of packed ware, comprising two unit loads, and which may be used for transporting the goods to and from the warehouse, and which permits the unit loads to be transferred individually from the pallet to a freight car, truck or the like, or transferred from the freight car to the pallet. This results in a substantial economy in the handling operations.

A further object of the invention is the provision of a wood pallet of the "take it or leave it" type, so constructed that the overall height is held down to a maximum of 6 inches which is the standard height of all wood pallets.

Other objects of the invention will appear hereinafter.

Referring to the accompanying drawings.

Figure 1:
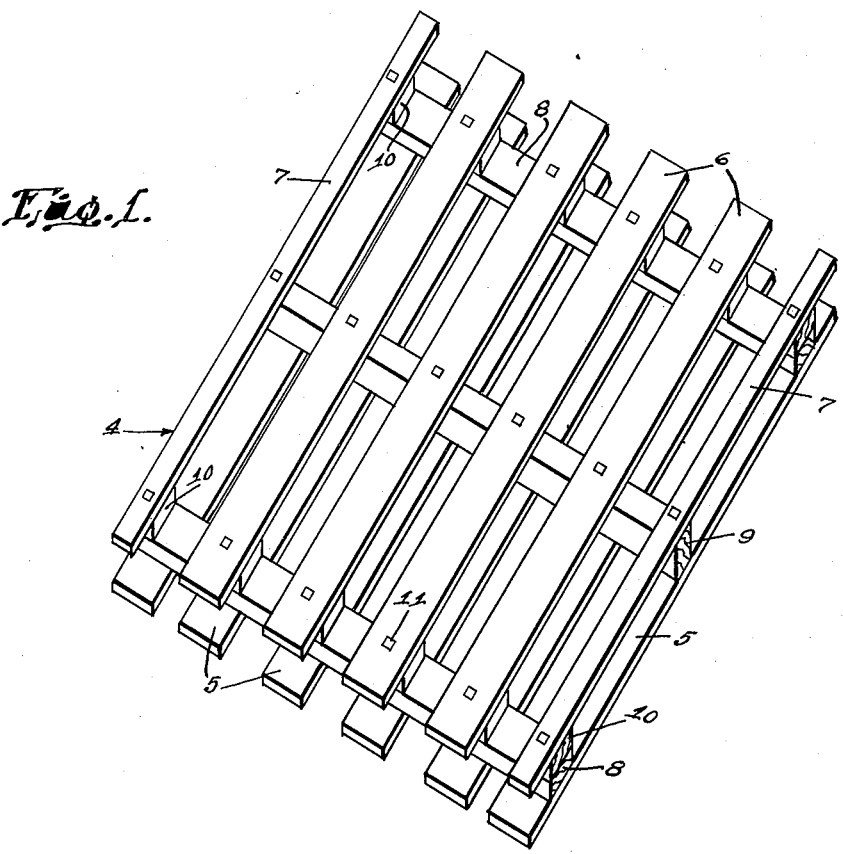
Fig. 1 is a perspective view of a preferred form of pallet embodying the present invention.

The pallet is preferably constructed of wood, but other suitable material may be used. It comprises a horizontal base consisting of parallel boards or strips 5 extending lengthwise of the pallet and spaced apart. A platform 4 on which the cartons or other articles are loaded, comprises load supporting elements in the form of strips or boards 6 extending the length of the pallet and which are arranged in parallel and spaced apart preferably at equal distances. The outer strips 7 of the platform as shown, are comparatively narrow. Cross bars or beams 8, perpendicular to the boards 5 and 6, overlie the boards 5 and extend the full width of the pallet. The cross bars 8 are located near the ends of the pallet. At an intermediate position which may be midway between the cross bars 8 is a supporting beam 9 extending transversely of the pallet. The boards 6 and 7 which form the loading platform are preferably positioned directly over and in register with the bottom boards 5. Spacing blocks 10 are interposed between the cross beams 8 and the boards forming the platform. The boards rest directly on the cross beam 9. The parts are secured together by bolts 11 or other fastening means. The bolts may extend through the boards 5 and 6 and the intermediate beams and spacing blocks.

Figure 2:
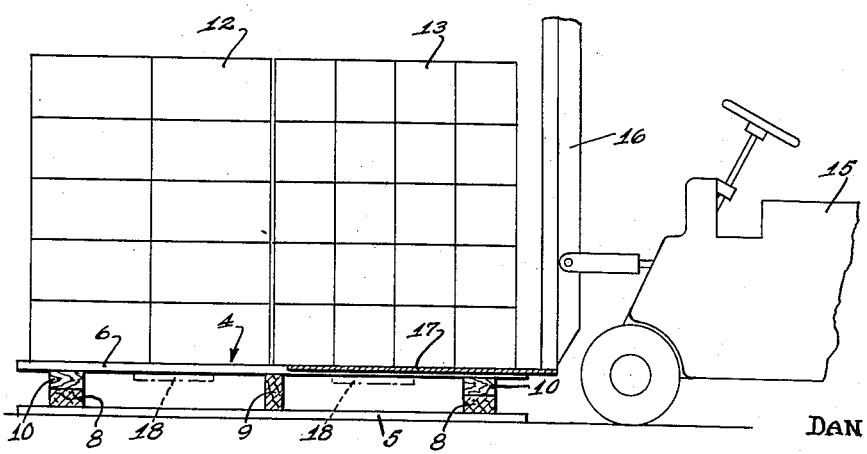
Fig. 2 is a longitudinal sectional elevation of the pallet with two unit loads thereon and a lift fork truck in position for lifting a load from the pallet.

The pallet as shown, Fig. 2, has two unit loads stacked thereon; one load consisting of cartons 12 and the other of cartons 13, the two loads occupying the two halves of the platform at opposite sides of the beam 9. An industrial truck 15 equipped with a lifting fork or device 16, including lifting arms 17, is shown in position to lift the unit load 13. In this position the lifting arms 17 extend forward in the spaces between the platform boards 6 permitting the load to be lifted off the pallet for transportation. The spacing blocks 10 give added depth to the spaces for the lifting arms 17 and facilitate the introduction of the arms to lifting position. The cross beam 9 may serve as a stop for the arms 17 as the truck is moved forward to position for lifting the load 13. The pallet may be of standard width, adapting it with the load 13 of corresponding width, for loading or unloading a freight car or truck. After the unit load 13 has been discharged, the truck 15 may be brought to the opposite end of the pallet and the load 12, removed in like manner.

For lifting the pallet with the two unit loads thereon, a fork lift truck is brought up to the side of the pallet and the lifting arms 18 are projected beneath the platform 4 as indicated by broken lines, Fig. 2. The pallet with the load thereon may then be lifted and transported to or from a warehouse, for example. The pallet is thus adapted for use as a carrier for transporting comparatively large loads each consisting of two unit loads, and also is adapted to permit either the removal therefrom or placing thereon of the two unit loads singly and in succession by a conventional lift fork.

Modifications may be resorted to within the spirit and scope of the invention as defined in the appended claims.

I claim:

1. A pallet comprising a base and a load-supporting platform positioned directly over the base, said base and platform each consisting of boards extending lengthwise of the pallet and laterally spaced apart, the boards forming the platform being directly over and in register with the boards forming said base, transverse beams interposed between the said base and platform and extending across the pallet perpendicular to said boards, and means for securing said platform, base and beams rigidly together, said means comprising spacing blocks seated on certain of the said transverse beams and positioned directly beneath the platform boards and spaced apart lengthwise of said beams to correspond with the spacing of the platform boards, said blocks supporting the platform with its lower surface a substantial distance above the upper surface of the transverse beams, the spacing of said platform boards and the said blocks providing upwardly opening spaces extending from the transverse beams upwardly between the spacing blocks and between the platform boards for the introduction of lifting arms at a level below that of the platform boards and directly beneath a load on the pallet and permitting the load to be lifted off the pallet by said arms with the latter in immediate engagement with the load.

2. The pallet defined in claim 1, wherein said beams include end beams adjacent to the ends of the pallet, and a central beam substantially midway between the end beams, said central beam being of greater depth than the end beams and attached directly to the base and platform and forming a stop for said lifting arms, the end beams being seated on and attached directly to the base.

3. A pallet comprising a horizontally disposed rectangular base, transverse beams overlying the base and secured thereto, a load supporting platform positioned directly over the base and spaced above the base and said beams, said platform comprising parallel, horizontally spaced strips extending lengthwise of the platform, spacing blocks mounted on said beams directly beneath said strips and spaced apart in the direction lengthwise of said beams and with the spaces between the blocks directly below and in register with the spaces between said strips, means for securing said strips, spacing blocks, beams and base together, said construction providing upwardly opening spaces extending lengthwise of the platform between said strips and extended downward between the spacing blocks to a greater depth than that of the platform strips for receiving lifting arms adapted to be inserted beneath a load on the pallet at a level below that of the platform and permitting the load to be lifted from the pallet by said arms, said pallet also providing open spaces between the platform and base which extend transversely of the pallet for receiving lifting arms between the base and platform.

4. The construction defined in claim 3, said beams being located adjacent to the ends of the pallet, and an intermediate beam extending across the pallet between the base and the platform in position to form a stop for the said lifting arms, the intermediate beam being substantially the full depth of the space between the base and platform.

5. The pallet defined in claim 3, the said base comprising strips directly beneath, parallel with and of substantially the same width as the strips forming said platform.

6. A pallet comprising a horizontally disposed rectangular base, transverse beams overlying the base and located adjacent to the ends of the pallet, spacing blocks mounted at horizontally spaced intervals on said beams, a load supporting platform positioned directly over the base comprising parallel, horizontally spaced strips extending lengthwise of said platform and overlying the spacing blocks, means for securing said strips, spacing blocks, beams and base together, said construction providing upwardly opening spaces extending lengthwise of the pallet between said strips and extending downwardly between the spacing blocks for receiving lifting arms adapted to be inserted beneath a load on the pallet with the lower surfaces of the arms below the bottom level of the platform strips and permitting the load to be lifted from the pallet by said arms, said pallet also providing open spaces between the platform and base which extend transversely of the platform for receiving lifting arms between the base and platform.

7. A pallet comprising a horizontally disposed rectangular base, a load supporting platform positioned directly over the base, transverse end beams overlying the base and located adjacent to the ends of the pallet, spacing blocks mounted on the end beams and horizontally spaced apart lengthwise of said end beams, a stop beam intermediate said end beams and spaced therefrom and extending transversely across the pallet between the base and the platform, the height of said intermediate beam being substantially equal to the combined depth of the transverse beams and spacing blocks, the load supporting platform comprising parallel, horizontally spaced strips extending lengthwise of said platform and overlying the spacing blocks, means for securing said strips, spacing blocks, beams and base together, said construction providing upwardly opening spaces extending lengthwise of the platform between said strips and extended downward between said spacing blocks for receiving lifting arms adapted to be inserted beneath a load on the pallet and permitting the load to be lifted from the pallet by said arms, said pallet also providing open spaces between the platform and base which extend transversely of the platform for receiving lifting arms between the base and platform.

DAN BOYD ADAMS.

REFERENCES CITED

The following references are of record in the file of this patent:

UNITED STATES PATENTS

| Number | Name | Date |
| --- | --- | --- |
| 2,297,347 | Cruickshank | Sept. 29, 1942 |
| 2,369,944 | Cahners | Feb. 20, 1945 |
| 2,371,878 | Cruickshank | Mar. 20, 1945 |
| 2,468,026 | Boone | Apr. 26, 1949 |
| 2,509,682 | Golrick | May 30, 1950 |